(12) United States Patent
Dalal (10) Patent No.: US 10,443,504 B2
(45) Date of Patent: Oct. 15, 2019

(54) METHOD FOR ALLOCATING POWER IN AN ELECTRICAL POWER SYSTEM ARCHITECTURE

(71) Applicant: GE AVIATION SYSTEMS, LLC, Grand Rapids, MI (US)

(72) Inventor: Manish Ashvinkumar Dalal, Englewood, OH (US)

(73) Assignee: GE Aviation Systems LLC, Grand Rapids, MI (US)

( * ) Notice: Subject to any disclaimer, the term of this patent is extended or adjusted under 35 U.S.C. 154(b) by 400 days.

(21) Appl. No.: 15/331,111

(22) Filed: Oct. 21, 2016

(65) Prior Publication Data

US 2018/0112599 A1   Apr. 26, 2018

(51) Int. Cl.
| | |
|---|---|
| *H02J 3/38* | (2006.01) |
| *F02C 7/262* | (2006.01) |
| *B64D 31/06* | (2006.01) |
| *F02N 11/04* | (2006.01) |
| *F02C 7/268* | (2006.01) |
| *H02J 4/00* | (2006.01) |
| *B64D 33/00* | (2006.01) |
| *H02J 1/10* | (2006.01) |

(52) U.S. Cl.
CPC ............... *F02C 7/262* (2013.01); *B64D 33/00* (2013.01); *F02C 7/268* (2013.01); *F02N 11/04* (2013.01); *H02J 4/00* (2013.01); *B64D 2221/00* (2013.01); *F05D 2220/32* (2013.01); *F05D 2220/76* (2013.01); *F05D 2270/13* (2013.01); *H02J 1/102* (2013.01); *H02J 3/38* (2013.01)

(58) Field of Classification Search
CPC ..... B64D 2221/00; B64D 33/00; F02C 7/262; H02J 4/00; H02J 3/38; F05D 2270/13; F05D 2220/32; F05D 2220/76
See application file for complete search history.

(56) References Cited

U.S. PATENT DOCUMENTS

| | | | | |
|---|---|---|---|---|
| 5,939,800 | A  * | 8/1999 | Artinian | B64D 13/06 244/53 R |
| 6,023,134 | A  * | 2/2000 | Carl | F02C 7/32 290/30 A |
| 7,439,634 | B2 * | 10/2008 | Michalko | H02J 4/00 307/43 |
| 9,327,600 | B1 * | 5/2016 | Nehmeh | B60L 1/00 |
| 2012/0013177 | A1 * | 1/2012 | Krenz | H02J 4/00 307/9.1 |
| 2014/0167516 | A1 | 6/2014 | Gataric et al. | |
| 2014/0333126 | A1 * | 11/2014 | Vyas | B60R 16/03 307/9.1 |
| 2016/0018878 | A1 * | 1/2016 | Dustman | G06F 1/3287 710/315 |
| 2016/0332740 | A1 * | 11/2016 | Eisenhauer | F02N 11/0866 |

* cited by examiner

*Primary Examiner* — Rexford N Barnie
*Assistant Examiner* — Terrence R Willoughby
(74) *Attorney, Agent, or Firm* — McGarry Bair PC (57) ABSTRACT

An electrical power system architecture and method for allocating power includes a power distribution bus configured to receive power generated by a first engine having a first generator and a second generator, a first set of electrical buses connected with the power distribution bus and associated with the first engine, and a second set of electrical buses configured to selectively connect with the power distribution bus.

20 Claims, 6 Drawing Sheets

METHOD FOR ALLOCATING POWER IN AN ELECTRICAL POWER SYSTEM ARCHITECTURE

BACKGROUND OF THE INVENTION

Turbine engines, and particularly gas turbine engines, also known as combustion turbine engines, are rotary engines that extract energy from a flow of combusted gases passing through the engine onto a multitude of turbine blades. Gas turbine engines have been used for land and nautical locomotion and power generation, but are also often used for aeronautical applications such as for airplanes, including helicopters. In airplanes, gas turbine engines are used for propulsion of the aircraft.

Gas turbine engines can have two or more spools, including a low pressure (LP) spool that provides a significant fraction of the overall propulsion system thrust, and a high pressure (HP) spool that drives one or more compressors and produces additional thrust by directing exhaust products in an aft direction.

Gas turbine engines also usually power a number of different accessories such as generators, starter/generators, permanent magnet alternators (PMA), fuel pumps, and hydraulic pumps, e.g., equipment for functions other than propulsion. For example, contemporary aircraft need electrical power for avionics, motors, and other electric equipment. A generator coupled with a gas turbine engine will convert the mechanical power of the engine into electrical energy needed to power accessories.

BRIEF DESCRIPTION OF THE INVENTION

In one aspect, the present disclosure relates to an electrical power system architecture including a power distribution bus configured to receive power generated by a first engine having a first generator system and a second generator system, a first set of electrical buses connected with the power distribution bus and associated with the first engine, a second set of electrical buses configured to selectively connect with the power distribution bus, including at least an essential bus, and associated with the second engine, and a share regulator configured to provide a set of share ratios values to the first generator system and the second generator system, and configured to receive an operational status of a second engine. Upon receipt of non-operational status of the second engine, the power distribution bus is configured to selectively disconnect the second set of electrical buses except for the essential bus, and the share regulator is configured to provide the set of share ratio values to the first generator system and second generator system selected to enabled the first and second generator systems to share allocation of power generation sufficient to energize the first set of electrical buses and the essential bus.

In another aspect, the present disclosure relates to a method for allocating power in an electrical power system architecture, including determining an operational status of a first engine system, and in response to determining the first engine system is non-operational, selectively disconnecting a first set of electrical loads associated with the first engine system from a power distribution bus except for a subset of essential electrical loads associated with the first engine system, providing a set of share ratio values to a second operational engine system having at least a first generator and a second generator, and operating the first and the second generators in accordance with the set of share ratio values such that the first and the second generators allocate a desired combined power output to the power distribution bus sufficient to energize a second set of electrical loads associated with the second engine system and the subset of essential electrical loads associated with the first engine system.

In yet another aspect, the present disclosure relates to a method for restarting a non-operational engine of a flying aircraft, including disabling a set of electrical loads associated with the non-operational engine from a power distribution bus except for a subset of essential electrical loads associated with the non-operational engine, selectively allocating a combined power output between at least two generator systems driven by at least one operational engine of the flying aircraft, and restarting the non-operational engine by way of a mechanically connected starter/generator supplied with at least a portion of the combined power output. The selectively allocating the combined power output is based at least on the summation of a first power demand for a set of electrical loads associated with the operational engine, a second power demand for the subset of essential electrical loads associated with the non-operational engine, and a third power demand for the restarting the non-operational engine.

DESCRIPTION OF EMBODIMENTS OF THE INVENTION

The described embodiments of the present innovation are directed to a method and apparatus associated with a modular power distribution rack. One example environment where such a method and apparatus can be used includes, but is not limited to, a power distribution system for an aircraft. While this description is primarily directed toward a power distribution system for an aircraft, it is also applicable to any environment using a nodal-based power distribution system where input power is received, acted upon (if necessary), e.g., converted or modified, and distributed to one or more electrical loads.

While "a set of" various elements will be described, it will be understood that "a set" can include any number of the respective elements, including only one element. Connection references (e.g., attached, coupled, connected, decoupled, disconnected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured to provide, enable, disable, or the like, an electrical connection between respective elements. Non-limiting example power distribution bus connections or disconnections can be enabled or operated by way of switching, bus tie logic, or any other connectors configured to enable or disable the energizing of electrical loads downstream of the bus. The exemplary drawings are for purposes of illustration only and the dimensions, positions, order and relative sizes reflected in the drawings attached hereto can vary.

Figure 1:
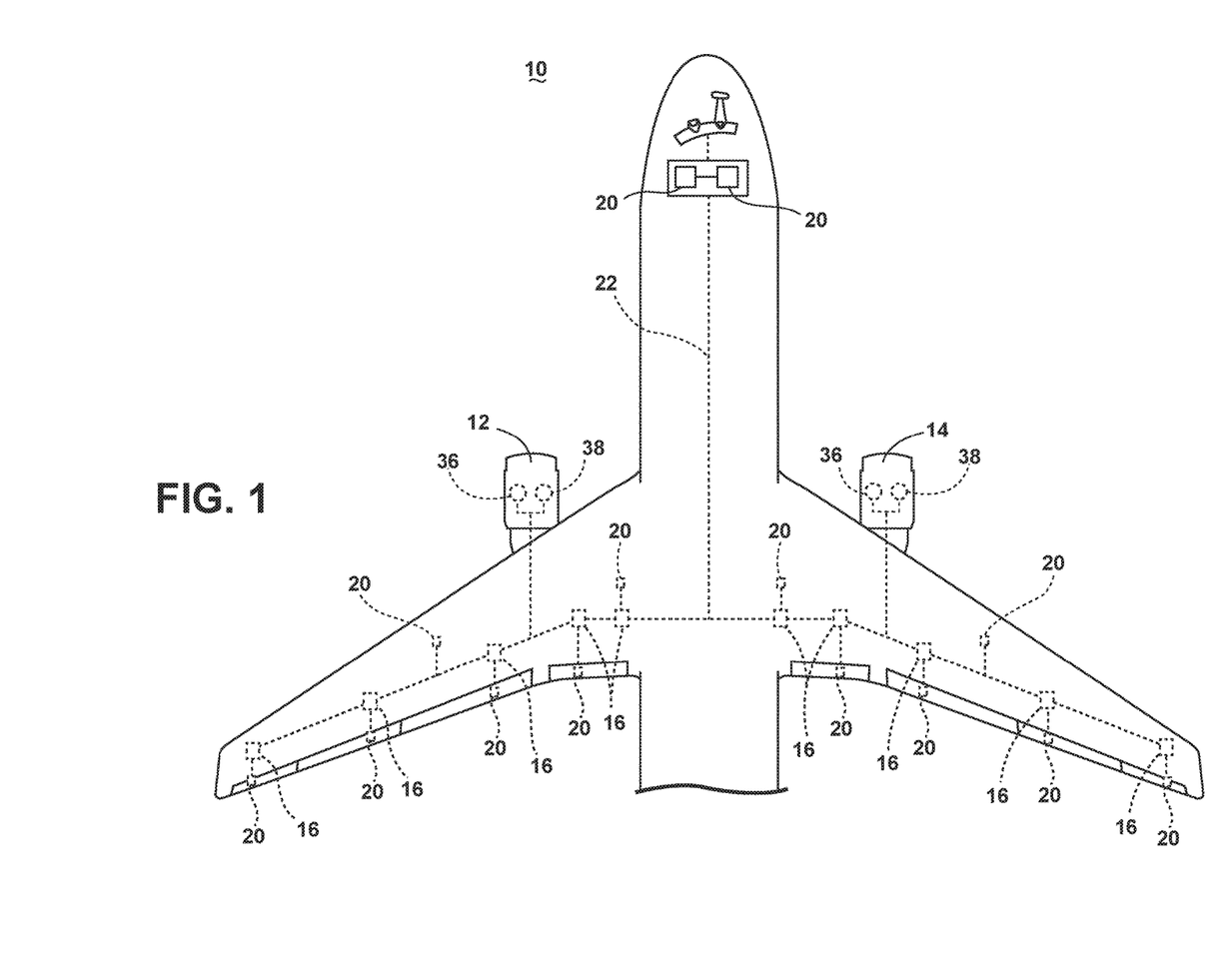
FIG. 1 is a top down schematic view of the aircraft and power distribution system of an aircraft.

As illustrated in FIG. 1, an aircraft 10 is shown having at least one gas turbine engine, shown as a left engine 12 and a right engine 14. Alternatively, the power system can have fewer or additional engine systems. The left and right engines 12, 14 can be substantially identical, and can further include at least one power source, such as an electric machine. As shown, the power sources can include a first generator 18 and a second generator 19 corresponding to the left engine 12, and the power sources can include a third generator 36 and a fourth generator 38 corresponding to the right engine 14. In one non-limiting configuration, the set of generators 18, 19, 36, 38 can be selectively configured to generate approximately 200 kW of electrical power. The aircraft is shown further having a set of power-consuming components, or electrical loads 20, such as for instance, an actuator load, flight critical loads, and non-flight critical loads. The set of electrical loads 20 are electrically coupled with at least one of the generators 18, 19, 36, 38 via a power distribution system including, for instance, power transmission lines 22 or bus bars, and power distribution nodes 16. It will be understood that the illustrated embodiment of the disclosure of FIG. 1 is only one non-limiting example of a power distribution system, and many other possible embodiments and configurations in addition to that shown are contemplated by the present disclosure. Furthermore, the number of, and placement of, the various components depicted in FIG. 1 are also non-limiting examples of embodiments associated with the disclosure.

In the aircraft 10, the operating left and right engines 12, 14 provide mechanical energy which can be extracted, typically via a spool or set of spools, to provide a driving force for the generators 18, 19, 36, 38. The generators 18, 19, 36, 38, in turn, generate power, such as AC or DC power, and provides the generated power to the transmission lines 22, which delivers the power to the power distribution nodes 16, positioned throughout the aircraft 10. The power distribution nodes 16 receive the AC or DC power via the transmission lines 22, and can provide switching, power conversion, or distribution management functions, as needed, in order to provide the desired electrical power to the set of electrical loads 20 for load operations.

Example power distribution management functions can include, but are not limited to, selectively enabling or disabling the delivery of power to particular electrical loads 20, depending on, for example, available power distribution supply, criticality of electrical load 20 functionality, or aircraft mode of operation, such as take-off, cruise, or ground operations. Additional management functions can be included. In this sense, the set of electrical loads 20 can include subsets of electrical loads 20, subdivided by criticality or assignment to a left or right engine 12, 14, or a respective generator 18, 19, 36, 38. Additional aspects of the subdivision of electrical loads 20 can be included. Furthermore, additional power sources for providing power to the electrical loads 20, such as additional engines 12, 14, emergency power sources, ram air turbine systems, starter/generators, or batteries, can be included. It will be understood that while one embodiment of the invention is shown in an aircraft environment, the invention is not so limited and has general application to electrical power systems in non-aircraft applications, such as other mobile applications and non-mobile industrial, commercial, and residential applications.

Aspects of the disclosure can include to allocating power generation among generators 18, 19, 36, 38, between a single engine 12, 14, or between a set of generators 18, 19, 36, 38 of different engines 12, 14, or among a set generators 18, 19, 36, 38 among a set of engines 12, 14.

Figure 2:
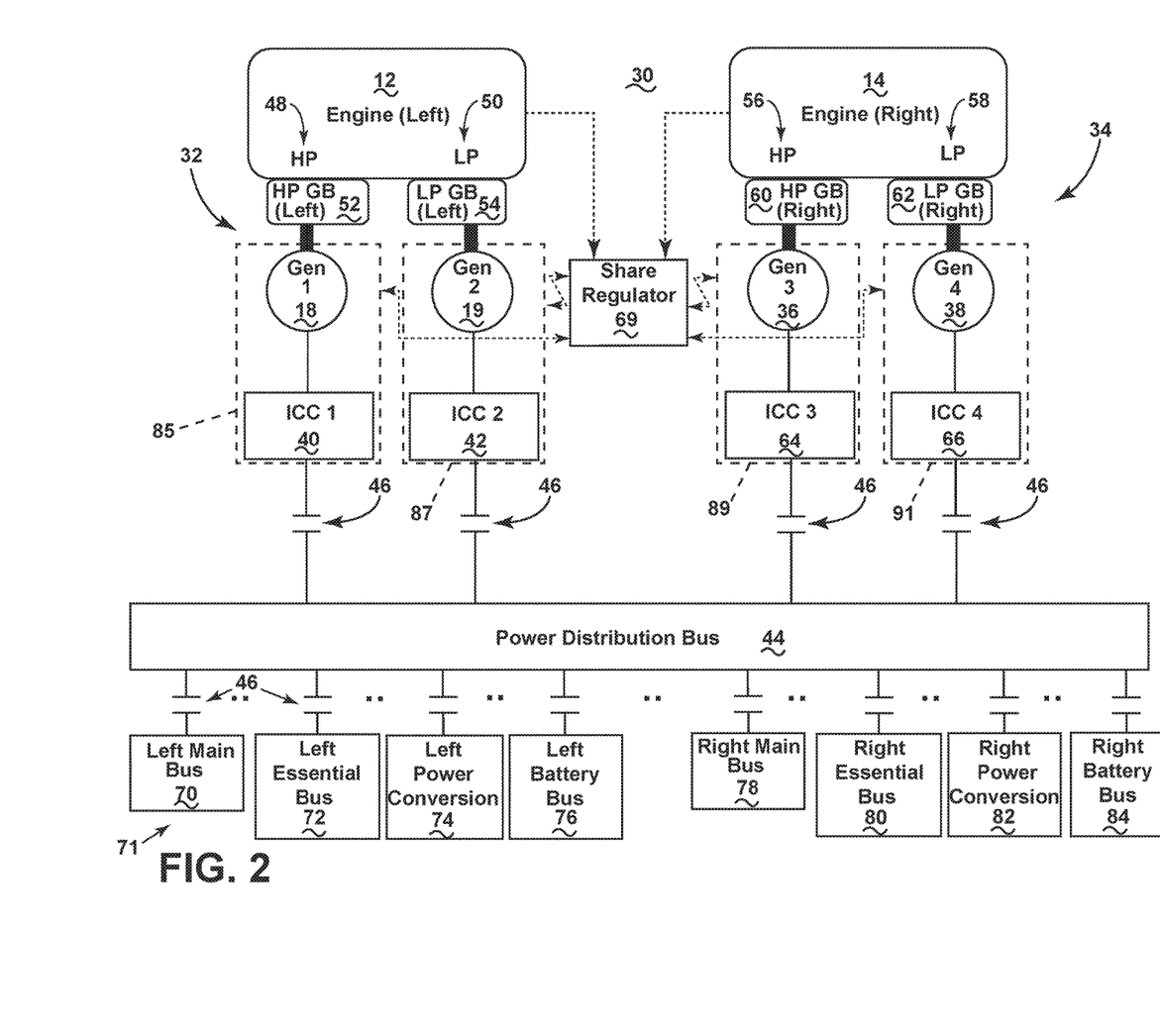
FIG. 2 is a schematic block diagram of an electrical power system architecture for the aircraft of FIG. 1, in accordance with various aspects described herein.

FIG. 2 is a schematic block diagram of an electrical power system architecture 30 in accordance with various aspects described herein. The system architecture 30 includes multiple generator systems, shown herein as including at least the left engine system 32 including the left engine 12, a first generator 18, and a second generator 19, and a right engine system 34 including the right engine 14, the third generator 36, and the fourth generator 38. Non-limiting aspects of the disclosure can be included wherein at least one generator 18, 19, 36, 38 can include a starter/generator, that is, a generator that is capable or enabled to provide a starting function for an operably coupled engine 12, 14 or engine system 32, 34 when supplied with a starting power. Specific methods or configurations of starter/generators are not germane to the aspects of the disclosure. Non-limiting configurations can be envisioned wherein at least one generator 18, 19, 36, 38 per engine 12, 14 or engine system 32, 34 is a starter/generator. Additionally, non-limiting aspects of the disclosure can be applied regardless of whether the generator 18, 19, 36, 38 is configured to generate alternating current (AC) power or direct current (DC) power.

Aspects of the disclosure can be included wherein the first generator 18 connects to a high pressure (HP) spool 48 of the left engine 12 by way of a HP spool gearbox 52 while the second generator 19 connects to a low pressure (LP) spool 50 of the left engine 12 by way of a LP spool gearbox 54. In this sense, the mechanical power provided by HP spool 48 operably drives the first generator 18 and the mechanical power provided by the LP spool 50 operably drives the second generator 19 for electrical power generation. The HP spool gearbox 52 and LP spool gearbox 54 can be selected, configured, or operable to enable a gear ratio to step-up or step-down a mechanical rotation speed of the respective HP spool 48 or LP spool 50 such that the connected generators 18, 19 and operably utilize the mechanical power to generate electrical power. Aspects of the disclosure can be included wherein at least one of the HP spool gearbox 52 or LP spool gearbox 54 is optional.

The first generator 18 and second generator 19 are shown in parallel arrangement and configured to provide respective generator power outputs to a first Inverter/Converter/Controller (ICC) 40 or second ICC 42. The first and second ICCs 40, 42 are further connected with a power distribution bus 44. As illustrated, the first generator 18 and the first ICC 40 can be included as part of a first generator system 85 and the second generator 19 and the second ICC 42 can be included as part of a second generator system 85. Also as shown, the first and second ICCs 40, 42 can be selectively connected with the power distribution bus 44 by way of respective selectively coupling links 46. As described herein, an ICC can be configured to operably enable or selectively implement inverting, converting, controlling, or the like, a first power received by the ICC to a second power supplied by the ICC. In this sense, the ICCs can operably convert a first power to a different second power. Converting can include, but is not limited to, altering an AC frequency, stepping up or stepping down an AC or DC voltage, AC-to-DC power conversion, DC-to-AC power conversion, or the like. Additionally, non-limiting aspects of the disclosure can be included wherein at least one ICC 40, 42 can be configured to provide bi-directional or uni-directional power converting. In this sense, at least one ICC 40, 42 can be included that can controllably or operably convert power supplied by a generator 18, 19, 36, 38 to the power distribution bus 44, as well as controllably or operably convert power supplied by the power distribution bus 44 to a generator 18, 19, 36, 38, such as a starter/generator. Non-limiting aspects of the disclosure can be included wherein the set of generators 18, 19 generate electrical power (AC or DC power) that is altered by way of the respective ICC 40, 42, to a common power supply for the power distribution bus 44. In one example, the common power supply can include 270 volts DC, ±270 volts DC, 115 volts AC at 400 Hertz, or 230 volts AC at 400 Hertz. Additional common power supplies can be included.

Non-limiting aspects of the right engine system 34 can be similar to aspects of the left engine system 32, unless otherwise noted. Thus, aspects of the disclosure can be further included wherein the third generator 36 connects to a high pressure (HP) spool 56 of the right engine 14 by way of a HP spool gearbox 60 while the fourth generator 38 connects to a low pressure (LP) spool 58 of the right engine 14 by way of a LP spool gearbox 62. In this sense, the mechanical power provided by HP spool 56 operably drives the third generator 36 and the mechanical power provided by the LP spool 58 operably drives the fourth generator 38 for electrical power generation. Aspects of the disclosure can be included wherein at least one of the HP spool gearbox 60 or LP spool gearbox 62 is optional.

The third generator 36 and fourth generator 38 are shown in parallel arrangement and configured to provide respective generator power outputs to a third ICC 64 or fourth ICC 66. The third and fourth ICCs 64, 66 are further connected with the power distribution bus 44. As illustrated, the third generator 36 and the third ICC 64 can be included as part of a third generator system 89 and the fourth generator 38 and the fourth ICC 66 can be included as part of a fourth generator system 91. Also as shown, the third and fourth ICCs 64, 66 can be selectively connected with the power distribution bus 44 by way of respective selectively coupling links 46. Similar to the left engine system 32, non-limiting aspects of the disclosure can be included wherein at least one ICC 64, 66 can be configured to provide bi-directional or uni-directional power converting.

The power distribution bus 44 can be further connected by way of a set of selectively coupling links 46 to a set of additional electrical loads or electrical buses 71 utilized to selectively supply power to the set of electrical loads (not shown). As shown, the set of additional electrical buses 71 can include, but is not limited to, a left main bus 70, a left essential bus 72, a left power conversion bus 74, a left battery bus 76, a right main bus 78, a right essential bus 80, a right power conversion bus 82, and a right battery bus 84. As shown, the set of electrical buses 71 can be arranged, categorized, organized, or selectively supplied by electrical power based upon an assignment to a respective engine system 32, 34 (e.g. left or right), or a classification of electrical loads (e.g. main bus loads, essential bus loads, etc.). In non-limiting aspects of the disclosure, the left engine system 32, or the generators 18, 19 associated with the left engine 12, can be primarily responsible for supplying a sufficient amount of energy for powering the "left" set of electrical buses 70, 72, 74, 76 under normal operating conditions. Likewise, aspects of the disclosure can be included wherein the right engine system 34, or the generators 36, 38 associated with the right engine 14, can be primarily responsible for supplying a sufficient amount of energy for powering the "right" set of electrical buses 78, 80, 82, 84.

In one non-limiting example configuration or classification of the electrical loads, the main bus can selectively enable or disable the powering or energizing of main loads, including non-critical electrical loads. In another non-limiting example configuration or classification of the electrical loads, the essential bus can selectively enable or disable the powering or energizing of essential, or flight-critical loads. As used herein "non-critical" electrical loads can include in-flight entertainment, galley functions, or the like, while "flight-critical" electrical loads can include flight management system, electrical flight actuators, or the like. In yet another non-limiting example configuration or classification of the electrical loads, the power conversion bus can selectively enable or disable additional power converting, similar to functions of the ICCs 40, 42, 64, 66, and the battery bus can selectively enable or disable the powering, energizing, recharging, or receiving of stored energy, for example, by way of a battery, supercapacitor, or another power-supplying device.

Non-limiting aspects of the electrical power system architecture 30 can also include a share regulator 69. The share regulator 69 can be communicatively coupled with the first generator system 85, the second generator system 87, the third generator system 89, the fourth generator system 91, or a subset of generators systems providing power to the power distribution bus 44. The share regulator 69 can also be communicatively coupled with the left engine 12 and the right engine 14. Although the illustrated embodiment shows the positioning of the sharing regulator 69 separate from the left or right engine systems 32, 34, alternate positioning is envisioned. For instance, in one non-limiting example configuration of the disclosure, the share regulator 69 can be located remotely from the engine systems 32, 34, or multiple share regulators can be positioned to correspond with each engine 12, 14, or to correspond with each generator 18, 19, 36, 38.

Non-limiting aspects of the disclosure can be included wherein the share regulator 69 is configured to receive an operational status, or signal representative thereof, from the left engine 12 or the right engine 14. As used herein, an operational status can include whether the engine 12, 14 is currently operating (e.g. providing thrust or providing mechanical energy for operating the coupled set of generators 18, 19, 36, 38), or whether the engine 12, 14 is not operating. Additional non-limiting aspects of the disclosure can be included wherein the share regulator 69 is configured to provide a share ratio value, or a signal representative thereof, to the set or a subset of the first and second generator systems 85, 87, or to the set or subset of the third and fourth generator systems 89, 91. Stated another way, the share regulator 69 can be configured to operably execute a power split ratio among the power sources based, as explained herein. In this sense, the set of generator systems 85, 87, 89, 91, or a subset thereof, can alter a corresponding power output of the respective generator 18, 19, 36, 38, for example, via the respective ICC 40, 42, 64, 66, in response to the share ratio value provided by the share regulator 69. In another non-limiting aspect of the disclosure, the share regulator 69 is configured to further receive a power output indicator, a desired power signal, a demanded power signal, or signal representative thereof, from the communicatively connected generator systems 85, 87, 89, 91, representative of the power generated by the respective generator 18, 19, 36, 38.

In one non-limiting example, the share ratio values include a desired power signal such that the generator operably generates more or less power, compared with normal power generation operations. For instance, the share ratio values can include a desired power signal selected, configured, or generated to enable the set of generator systems 85, 87, 89, 91 or the set of generators 18, 19, 36, 38, or a subset thereof, to operate in overload mode (e.g. increasing power output) for a limited period of time. The limited period of time can be based on, for instance, the cooling capabilities of the generator 18, 19, 36, 38, the power output of the generator 18, 19, 36, 38 during normal operation or overload operation, the desired or demanded power as indicated by the share ratio value or desired power signal, of the criticality of the desired or demanded power. In one non-limiting aspect of the disclosure, a failed or non-operational engine in need of a restarting power supply can have a high criticality for the desired power, resulting in operating an operational generator 18, 19, 36, 38 or generator system 85, 87, 89, 91 in overload operation, compared with a demand for a desired power for supplemental lighting. In one non-limited example, overload operation can for a period of time less than or equal to five minutes. In another non-limited example, overload operation can last until the condition causing the need for excess power subsides or is relieved.

Non-limiting aspects of the disclosure can be included wherein the electrical power system architecture 30 described can be configured to allocate power among the generator systems 85, 87, 89, 91, or a subset thereof, based on the share ratio value provided by the share regulator 69. For instance, the share regulator 69 can be configured to provide instruction to allocate power output between the first and second generator system 85, 87 for operably powering the power distribution bus 44 or a set or subset of electrical buses 71, such as the set of "left" buses 70, 72, 74, 76. Likewise, the share regulator 69 can be configured to provide instruction to allocate power output between the third and fourth generator system 89, 91 for operably powering the power distribution bus 44 or a set or subset of electrical buses 71, such as the set of "right" buses 78, 80, 82, 84.

The summation of the share ratio values represents the full desired power load for the power supplied by the respective left or right engine system 32, 34. Thus, the share ratio values can be any value between (and including) 0 and 1 representing the ratio of load handled by each generator versus total respective load, such that the summation of the share ratio values equals 1.0. Alternate share command values and ranges are envisioned. If there are more than two generators whose power is to be allocated, then each share ratio value can be a fraction of 1, so long as the summation of all share ratio values equals 1.0. In addition to providing instruction on power output allocation between the respective generators 18, 19, 36, 38 or generator systems 85, 87, 89, 91, the share regulator 69 can also be configured to receive the desired power signal from the generators 18, 19, 36, 38 or generator systems 85, 87, 89, 91 to ensure or confirm the expected allocation of power is provided.

Non-limiting aspects of the disclosure can be included wherein the share regulator 69 can be configured to provide a share ratio value to the generator systems of an engine system (e.g. the third and fourth generators systems 89, 91 of the right engine system 34) to account for a particular operational circumstance, such as the operation or operational status of another engine system (e.g. the left engine system 32). For example, if the left engine 12 or left engine system 32 has failed, been damaged, been disabled, stalled, or is otherwise non-operational, the share regulator 69 can enable, provide, or command the third generator 36, fourth generator 38, another generator, a generator system 89, 91, or a combination thereof, to generate power in accordance with a share ratio value corresponding to the non-operational status of the left engine 12 or left engine system 32.

Although the first generator 18 is shown coupled with the HP spool 48, and the second generator 19 is shown coupled with the LP spool 50, it is envisioned that any generator/spool combination can function similarly, e.g., the first generator system 18 can be coupled with the LP spool 50, and so on. Similar alternative generator/spool arrangements are envisioned for the third and fourth generators 36, 38, or a combination thereof. Moreover, the electrical power system architecture 30 can also be implemented on an engine 12, 14 or engine system 32, 34 having more than two generators or more than two spools, such as a 3-spool/3-generator engine having an intermediate pressure spool in addition to the HP and LP spools.

Aspects of the disclosure can be included wherein an estimated, predetermined, or demanded amount of power is sufficient to supply the desired operating condition of the aircraft or the engine systems 32, 34, and shared between the set or a subset of operational generators 18, 19, 36, 38. For example, the demanded power supply for a desired operating condition can be based on a number of factors, including, but not limited to, a parasitic resistance of the respective generators 18, 19, 36, 38 or desired electrical loads 70, 72, 74, 76, 78, 80, 82, 84, the expected current draw of the desired electrical loads 70, 72, 74, 76, 78, 80, 82, 84, or the like.

The desired or demanded power allocation can be determined by manual input, an executable computer program, an expected operating characteristics of the gas turbine engines 12, 14, a referenced from known data such as a lookup table, or the like. The computer program can include a computer program product that can include machine-readable media for carrying or having machine-executable instructions or data structures stored thereon. Such machine-readable media can be any available media, which can be accessed by a general purpose or special purpose computer or other machine with a controller. Generally, such a computer program can include routines, programs, objects, components, data structures, and the like, that have the technical effect of performing particular tasks or implement particular abstract data types. Machine-executable instructions, associated data structures, and programs represent examples of program code for executing the exchange of information as disclosed herein. Machine-executable instructions can include, for example, instructions and data, which cause a general purpose computer, special purpose computer, or special purpose processing machine to perform a certain function or group of functions. Aspects of the disclosure are envisioned wherein the share regulator 69 can include a controller module configured for executing such computer programs, and can additionally receive the operational data from a controllable component, the control loop feedback mechanism, or from an external signal generated by, for example, the left or right engines 12, 14, a set of the generators 18, 19, 36, 38, or a set of generator systems 85, 87, 89, 91.

During transient moments where the set of generators 18, 19, 36, 38 or generator systems 85, 87, 89, 91 do not confirm the desired power allocation of the respective engine system 32, 34, the share regulator 69 can further alter the share ratio values in order to modify the power output of the respective generator.

Aspects of the disclosure can also be included wherein the share regulator 69 or the share ratio values can vary over the flight phase of the aircraft. For example, in one set of non-limiting share ratio values, the share ratio power demand can be 50% of power supplied by the first generator system 85 and 50% of power supplied by the second generator system 87, during a taxi phase, or taxiing of the aircraft. In another non-limiting example, the share ratio power demand can be 75% of power supplied by the first generator system 85 and 25% of power supplied by the second generator system 87, during a take-off or a climb phase of the aircraft. In yet another non-limiting example, the share ratio power demand can be 50% of power supplied by the first generator system 85 and 50% of power supplied by the second generator system 87, during a cruise phase of the aircraft. In yet another non-limiting example, the share ratio power demand can be 25% of power supplied by the first generator system 85 and 75% of power supplied by the second generator system 87, during a descent phase of the aircraft. In yet another non-limiting example, the share ratio power demand can be 50% of power supplied by the first generator system 85 and 50% of power supplied by the second generator system 87, during a final approach or landing phase of the aircraft.

While only the first and second generators system 85, 87 of the left engine system 32 are referenced, similar share ratio values can be provided with respect to the third and fourth generators systems 89, 91 of the right engine system 34. In another non-limiting aspect, the aforementioned share ratio values can be described relative to the spool of the engine 12, 14, as opposed to a particular generator 18, 19, 36, 38 or generator system 85, 87, 89, 91. For example, the share ratio power demand can be 75% of power supplied by the generator system connected with the HP spool 48, 56 and 25% of power supplied by the generator system connected with the LP spool 50, 58, during a take-off or a climb phase of the aircraft. The aforementioned example share ratio values assume all engine systems 32, 34 are operational, or that all generator systems 85, 87, 89, 91 are generating power as expected (i.e. "normal operation"). Actual power demand from the set of generators 18, 19, 36, 38 or set of generator system 85, 87, 89, 91 can be different from the aforementioned values. As used herein, the percentages can be related to an amount of power demanded, current demanded, or the like.

Figure 3:
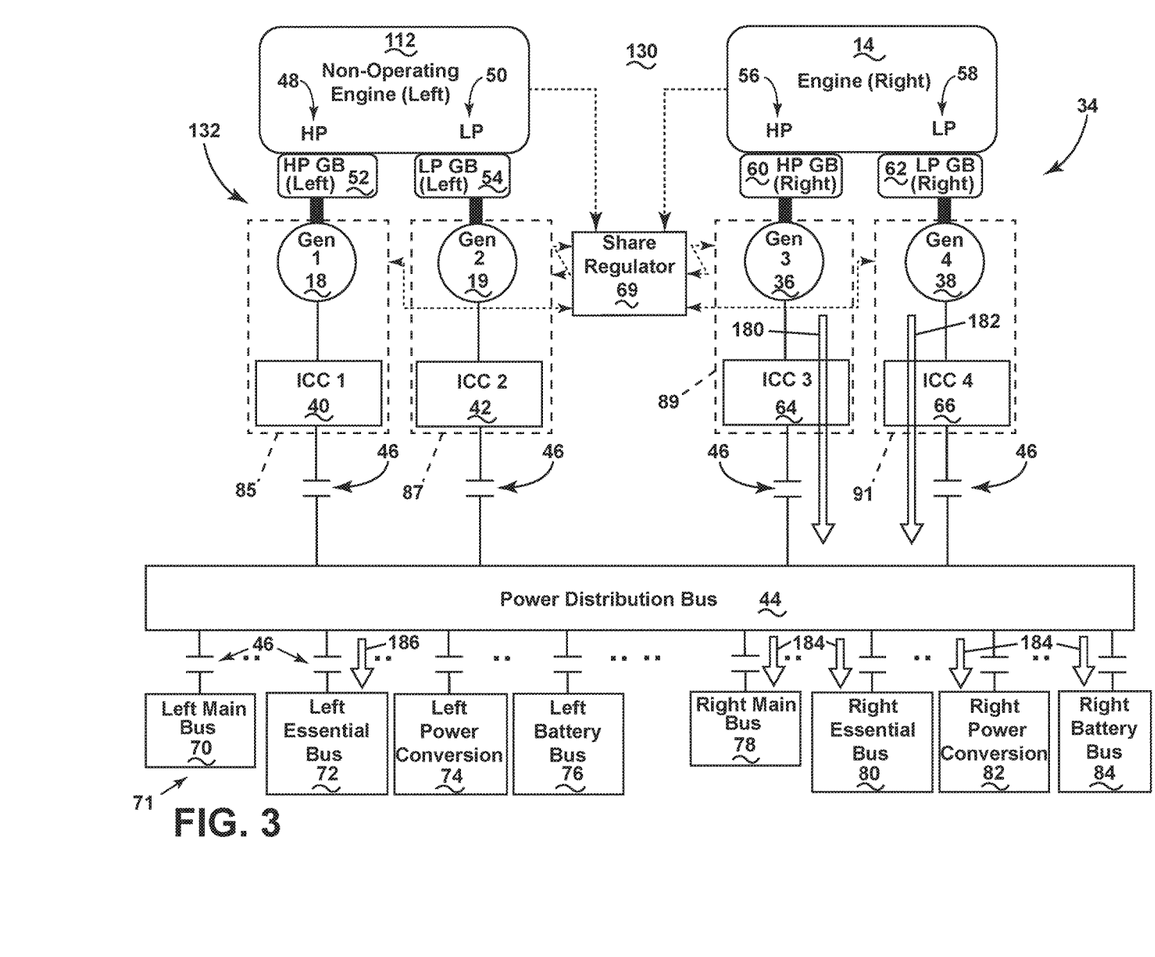
FIG. 3 is a schematic block diagram of an electrical power system architecture of FIG. 2, wherein one of the engines is non-operational, in accordance with various aspects described herein.

FIG. 3 illustrates one non-limiting example operation of the electrical power system architecture 130 described herein. The electrical power system architecture 130 is similar to the electrical power system architecture 30; therefore, like parts will be identified with like numerals increased by 100, with it being understood that the description of the like parts of the electrical power system architecture 30 applies to the electrical power system architecture 130, unless otherwise noted. One difference is that the left engine 112 or the left engine system 132 is non-operational, as shown. In the illustrated example, the share regulator 69 can receive the non-operational status from the left engine 112, or can receive a desired power signal from at least one of the first or second generator 18, 19 indicating no or low power generation. The share regulator 69 can, in response, provide a set of share ratio values to the third generator system 89 and fourth generator system 91 such that they generate a corresponding first power output (illustrated as arrow 180) and a second power output (illustrated as arrow 182), respectively, and provide the first and second power outputs 180, 182 to the power distribution bus 44.

Non-limiting aspects of the disclosure can be included wherein the power distribution bus 44, or a controlling mechanism thereof, selectively operates the set of selective coupling links 46 to selectively shed a subset of the electrical buses 71 associated with the left engine 112 or the left engine system 132. In one non-limiting example, the left main bus 70, the left power conversion bus 74, the left battery bus 76, or a subset thereof can be selectively disabled or disconnected from the power distribution bus 44, for instance, by way of the selective coupling links 46. Aspects of the disclosure can be included wherein the essential buses 72, 80 can be required or necessarily powered during all flight operations, regardless of the operational status of the respective associated engine. In this sense, the left essential bus 72 will be supplied power by the power distribution bus 44 despite the left engine 112 or left engine system 132 being non-operational.

Thus, non-limiting aspects of the disclosure can be included wherein the operating right engine 14 or right engine system 134, or generator systems 89, 91 thereof, can be controllably operated by way of the share ratio values provided by the share regulator 69 to operably generate and supply respective power outputs 180, 182 to the power distribution bus 44 that are sufficient to electrically power the left essential bus 72 (supply power illustrated by arrow 186) in addition to the associated right engine electrical buses 78, 80, 82, 84 (supply power illustrated by arrow 184), or a subset thereof. Stated another way, the allocating of power by the third and fourth generator systems 89, 91, by the share regulator 69, by the power distribution bus 44, or by a combination thereof, can be based at least upon the combined power needs, requirements, desires, or summation thereof, of the associated operational engine's electrical buses 78, 80, 82, 84 or subset thereof, and the essential bus 72 of the non-operational engine. In this sense, at least one of the third or fourth generators 36, 38 or generator systems 89, 91 can be designed, selected, sized, or otherwise selectively configured to operably generate a desired or demanded amount of electrical power to supply the desired operating condition illustrated, as shared between the generators 36, 38, or generator system 89, 91, as described herein.

Figure 4:
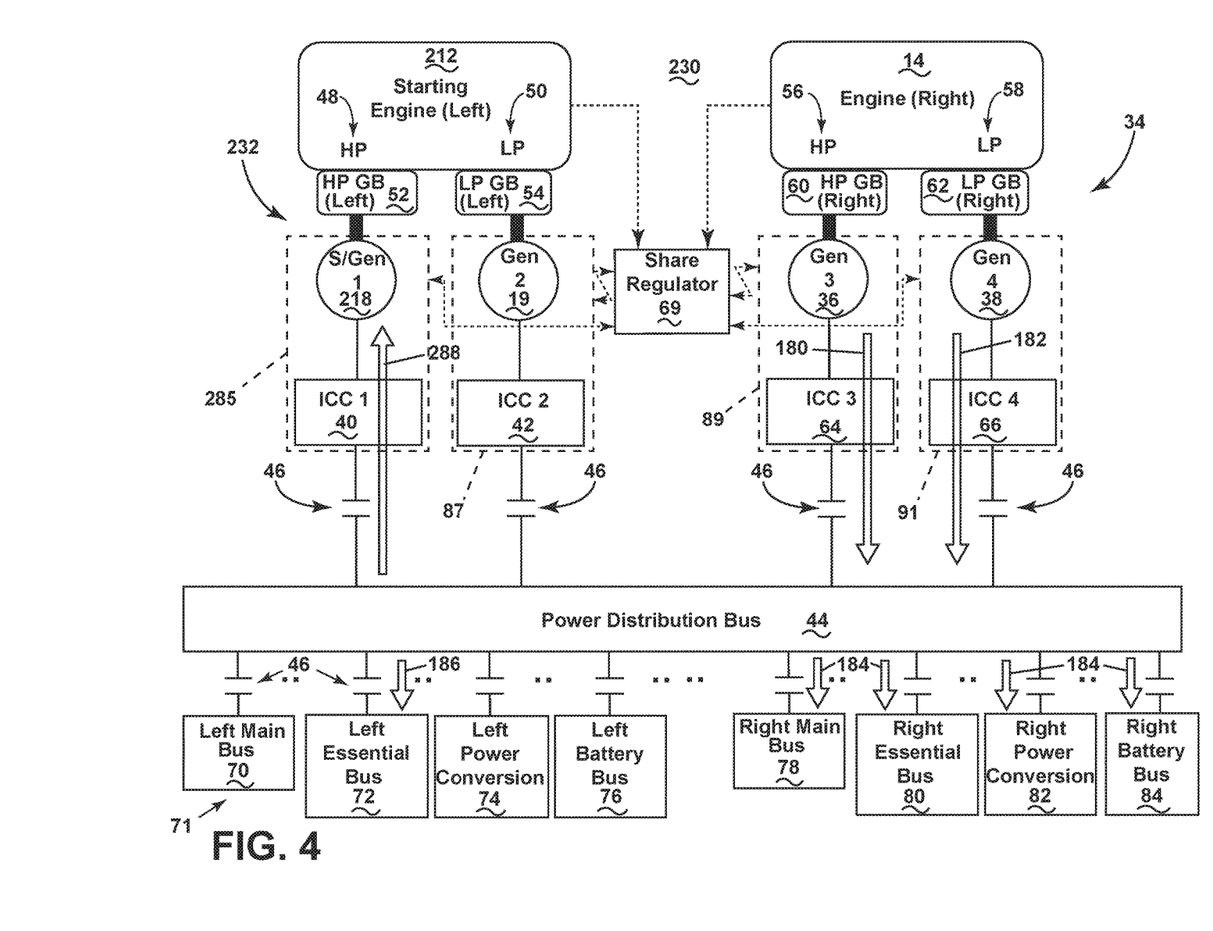
FIG. 4 is a schematic block diagram of an electrical power system architecture for the aircraft of FIG. 3, wherein the non-operational engine is restarting, in accordance with various aspects described herein

FIG. 4 illustrates another non-limiting example operation of the electrical power system architecture 230 described herein. The electrical power system architecture 230 is similar to the electrical power system architecture 30, 130; therefore, like parts will be identified with like numerals increased by 200, with it being understood that the description of the like parts of the electrical power system architecture 30, 130 applies to the electrical power system architecture 230, unless otherwise noted. One difference is that the left engine 212 or the left engine system 232 is being restarted in a starting or restarting mode. In this configuration, at least one of the first and second generators are a starter/generator (illustrated as first starter/generator 218 and first generator system 285) and wherein the starting left engine 212 is being electrically restarted by way of a restarting power supply (illustrated as arrow 288) being selectively supplied to the starter/generator 218 or generator system 285.

The share regulator 69 can, in response to the scenario depicted, provide a set of share ratio values to the third generator 36 and fourth generator 38, or respective generator systems 89, 91, such that they generate the corresponding first power output 180 and the second power output 182, respectively, and provide the first and second power outputs 180, 182 to the power distribution bus 44. Non-limiting aspects of the disclosure can be included wherein the power distribution bus 44, or a controlling mechanism thereof, selectively operates the set of selective coupling links 46 to selectively shed a subset of the electrical buses 71 as described with reference to FIG. 3, while selectively supplying power 186 to the left essential bus 72 and supplying power 184 to the associated right engine electrical buses 78, 80, 82, 84 or subset thereof, as well as supplying restarting power 288 to the first starter/generator 218. Stated another way, the allocating of power by the third and fourth generators 36, 38 or generator systems 89, 91, by the share regulator 69, by the power distribution bus 44, or by a combination thereof, can be based at least upon the combined power needs, requirements, desires, or summation thereof, of the associated operational engine's electrical buses 78, 80, 82, 84 or subset thereof, the essential bus 72 of the non-operational engine, and the starting or restarting power 288 supplied to the non-operational engine. In this sense, at least one of the third or fourth generators 36, 38 or generator systems 89, 91 can be designed, selected, sized, or otherwise selectively configured to operably generate a desired or demanded amount of electrical power to supply the desired operating condition illustrated, as shared between the generators 36, 38, as described herein.

In the restarting mode, the first starter/generator 218 or the first ICC 40 can be configured to receive the restarting power 288 from the power distribution bus 244, the third generator 36, the fourth generator 38, or a combination thereof, and operates to initiate movement in the prime mover of the first starter/generator 218, which in turn initiates rotational movement in the starting left engine 212, for example, by way of the corresponding gearbox 52, 54. In one non-limiting aspect of the disclosure, the first ICC 40 can be configured to convert, alter, modify, or the like, the restarting power 288 received from the power distribution bus 44, the third generator 36, the fourth generator 38, or a combination thereof. In another non-limiting aspect of the disclosure, at least one of the first ICC 40, the first starter/generator 218, or the share regulator 69 can operate a method of restarting the left engine 212 or left engine system 232 according to a starting or restarting method, predetermined profile, optimized operation, frequency stepping-operation, or by a dynamic feedback profile based on physical or electrical characteristics of the first starter/generator 218, the left engine 212, or a combination thereof.

Once the left engine 212 or left engine system 232 reaches a minimal operating speed (e.g. engine light off speed), for instance, as defined by the starting or restarting method, at least one of the first starter/generator 218 or the second generator 19 changes from starting mode to generating mode. When changed to the generating mode, at least one of the first starter/generator 218 or the second generator 19 returns to generating a power supply, and providing the power supply to a respective first or second ICC 40, 42, the power distribution bus 44, the set or a subset of electrical buses 71, or a combination thereof.

In one non-limiting aspect of the disclosure, when the left engine 212 or left engine system 232 has been successfully restarted, the share regulator 69 can be configured to provide respective share ratio values to the first starter/generator 218 and the second generator 19, as described herein, in accordance with normal operation. In another non-limiting aspect of the disclosure when the left engine 212 or left engine system 232 has been successfully restarted, the share regulator can be configured to provide respective share ratio values to the third and fourth generators systems 89, 91, in accordance with normal operation. For example, the power output of the third and fourth generators 36, 38 or generator systems 89, 91 can be controllably reduced due to the ceasing of supplying at least the restarting power 288 or the left essential bus power supply 186. In yet another non-limiting aspect of the disclosure when the left engine 212 or left engine system 232 has been successfully restarted, the power distribution bus 44 can selectively connect or re-energize the previously shed or disabled subset of electrical buses, including, but not limited to, the left main bus 70, the left power conversion bus 74, and the left battery bus 76.

In one set of non-limiting share ratio values for restarting a non-operational engine, the share ratio power demand can be 25% of power supplied by the third generator system 89 and 75% of power supplied by the fourth generator system 91, during a taxi phase, or taxiing of the aircraft. In another non-limiting example, the share ratio power demand for restarting a non-operational engine can be 50% of power supplied by the third generator system 89 and 50% of power supplied by the fourth generator system 91, during a take-off or a climb phase of the aircraft. In yet another non-limiting example, the share ratio power demand for restarting a non-operational engine can be 25% of power supplied by the third generator system 89 and 75% of power supplied by the fourth generator system 91, during a cruise phase of the aircraft. In yet another non-limiting example, the share ratio power demand for restarting a non-operational engine can be 10% of power supplied by the third generator system 89 and 90% of power supplied by the fourth generator system 91, during a descent phase of the aircraft. In yet another non-limiting example, the share ratio power demand for restarting a non-operational engine can be 25% of power supplied by the third generator system 89 and 75% of power supplied by the fourth generator system 91, during a final approach or landing phase of the aircraft.

While the aforementioned example operation was described with reference to the right engine 14 or right engine system 34 operating to supply electrical power while restarting the left engine 212 or left engine system 232, non-limiting aspects of the disclosure can be equally applied to any operational first engine or first engine system having a set of operational generators supplying a starting or restarting power 288 to a non-operational second engine or second engine system. In another non-limiting aspect, the aforementioned share ratio values can be described relative to the spool of the engine 12, 14, as opposed to a particular generator 18, 19, 36, 38, 218. For example, the share ratio power demand can be 25% of power supplied by the generator system connected with the HP spool 48, 56 and 75% of power supplied by the generator system connected with the LP spool 50, 58, during a take-off or a climb phase of the aircraft. Actual power demand from the set of generators 18, 19, 36, 38, 218 or generator system 85, 87, 89, 91, 285 can be different from the aforementioned values. As used herein, the percentages can be related to an amount of power demanded, current demanded, or the like.

As previously described, aspects of the disclosure in accordance with FIG. 3 or FIG. 4 can include operating a set or subset of the generators 18, 19, 36, 38 or generator systems 85, 87, 89, 91 in accordance with a desired power signal, to operate at above-normal, exceeded-rating, or overload power generation modes.

Figure 5:
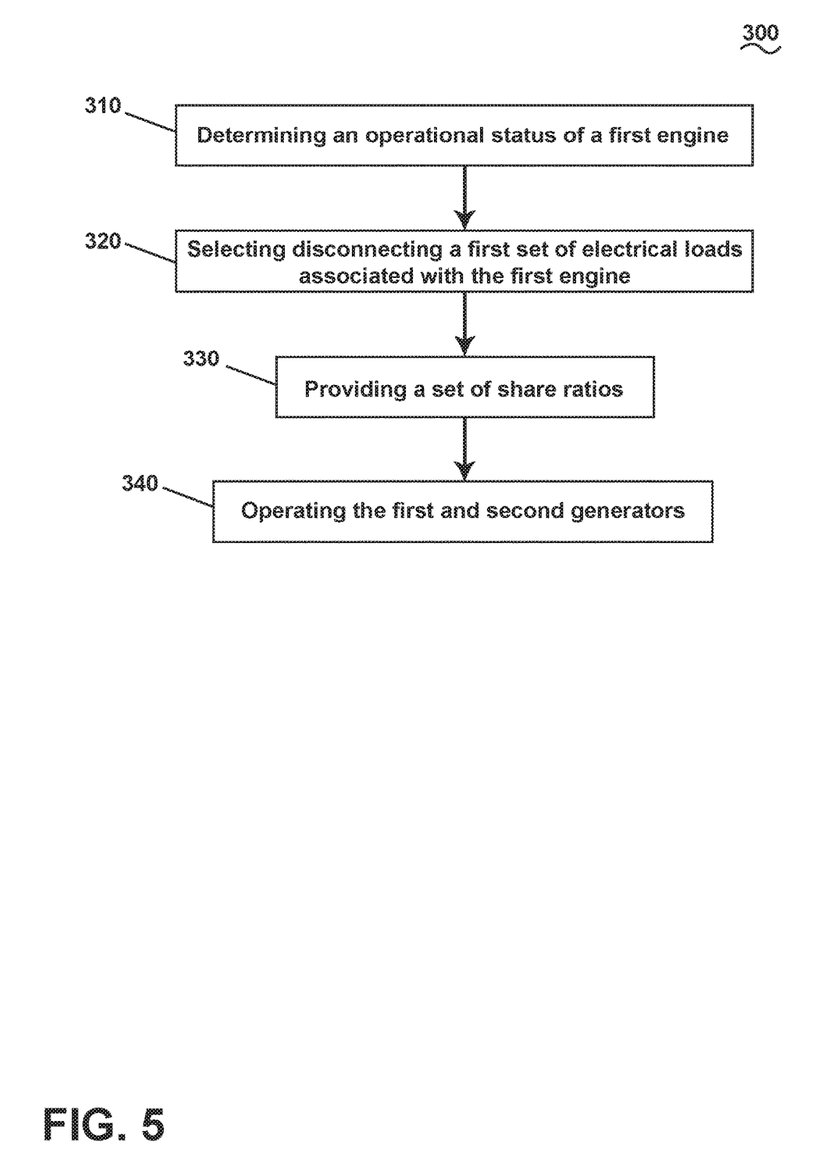
FIG. 5 is an example a flow chart diagram of demonstrating a method of for allocating power in the electrical power system architecture, in accordance with various aspects described herein.

FIG. 5 illustrates a flow chart demonstrating a method 300 for allocating power in an electrical power system architecture 30, 130, 230. The method 300 begins by determining an operational status of first engine 12, 14, 112, 212 or first engine system 32, 34, 132, 232 at 310. Next, in response to determining the first engine 12, 14, 112, 212 or first engine system 32, 34, 132, 232 is non-operational, selectively disconnecting a first set of electrical loads 70, 74, 76 associated with the first engine system from a power distribution bus except for a subset of essential electrical loads associated with the first engine 12, 14, 112, 212 or first engine system 32, 34, 132, 232 at 320. The method 300 then continues to providing a set of share ratio values to a second operational engine 12, 14, 112, 212 or second engine system 32, 34, 132, 232 having at least a first generator 18, 19, 36, 38 and a second generator 18, 19, 36, 38, at 330. Next, the method 300 includes operating the first and the second generators 18, 19, 36, 38 or generator systems 85, 87, 89, 91, 285 in accordance with the set of share ratio values such that the first and the second generators 18, 19, 36, 38 or generator systems 85, 87, 89, 91, 285 allocate a desired combined power output to the power distribution bus 44 sufficient to energize a second set of electrical loads 78, 80, 82, 84 associated with the second engine 12, 14, 112, 212 or second engine system 32, 34, 132, 232 and the subset of essential electrical loads 72 associated with the first engine 12, 14, 112, 212 or first engine system 32, 34, 132, 232.

Figure 6:
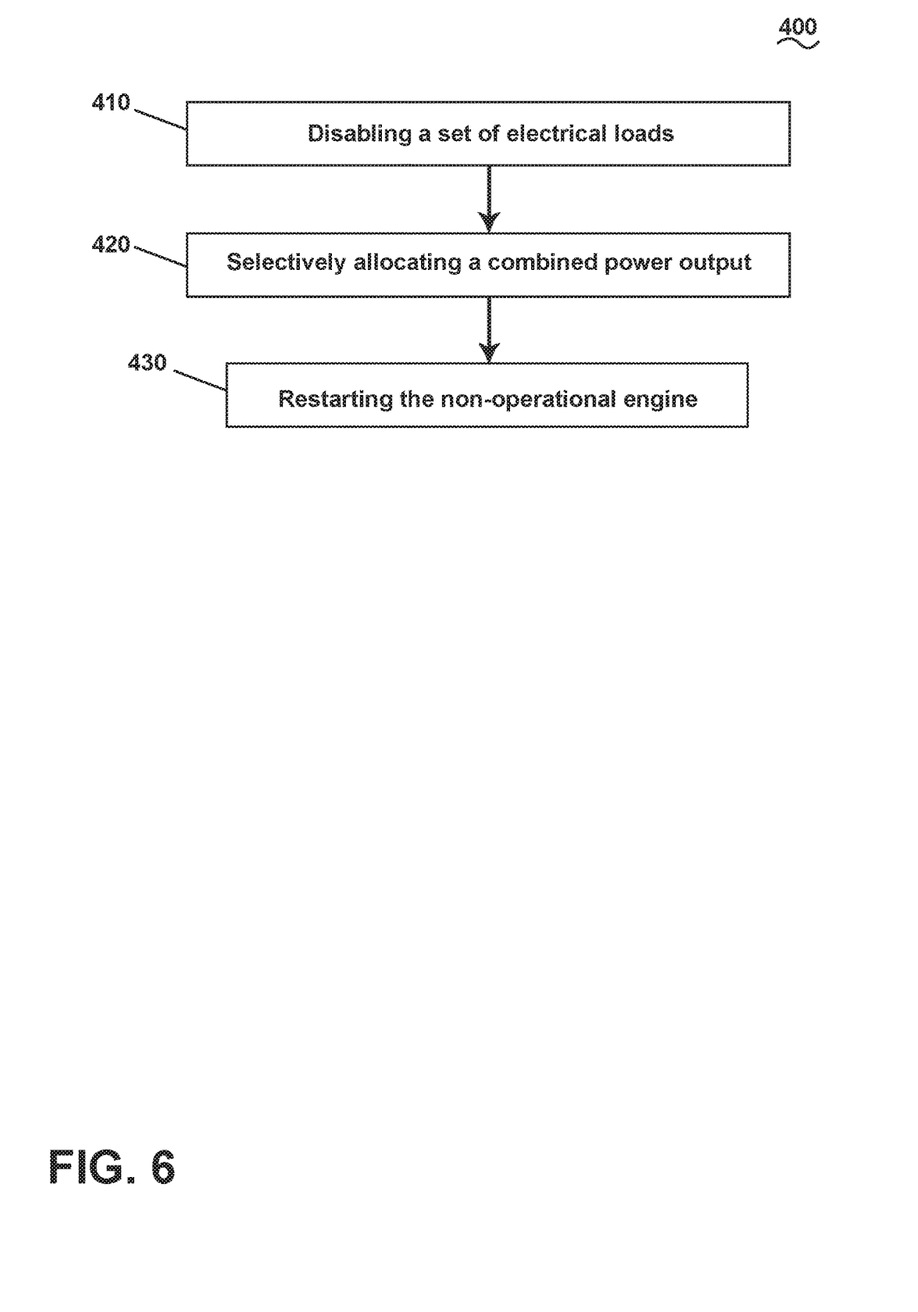
FIG. 6 is a method of restarting a non-operational engine, in accordance with various aspects described herein.

FIG. 6 illustrates a flow chart demonstrating a method 400 for restarting a non-operational engine 12, 14, 112, 212 of a flying aircraft 10. The method 400 starts with disabling a set of electrical loads 70, 74, 76 associated with the non-operational engine 12, 14, 112, 212 from a power distribution bus 44 except for a subset of essential electrical loads 72 associated with the non-operational engine 12, 14, 112, 212 at 410. Next, the method 400 continues by selectively allocating a combined power output between at least two generators 18, 19, 36, 38, 218 or generator systems 85, 87, 89, 91, 285 driven by at least one operational engine 12, 14, 112, 212 in the flying aircraft 10, at 420. The method 400 then proceeds to restarting the non-operational engine 12, 14, 112, 212 by way of a mechanically connected starter/generator 218 supplied with at least a portion of the combine power output. The selectively allocating the combined power output is based at least on the summation of a first power demand for a set of electrical loads associated 78, 80, 82, 84 with the operational engine 12, 14, 112, 212, a second power demand for the subset of essential electrical loads 72 associated with the non-operational engine 12, 14, 112, 212, and a third power demand for the restarting the non-operational engine 12, 14, 112, 212.

The sequences depicted is for illustrative purposes only and are not meant to limit the methods 300, 400 in any way as it is understood that the portions of the methods 300, 400 can proceed in a different logical order, additional or intervening portions can be included, or described portions of the methods 300, 400 can be divided into multiple portions, or described portions of the methods 300, 400 can be omitted without detracting from the described methods 300, 400.

Many other possible embodiments and configurations in addition to that shown in the above figures are contemplated by the present disclosure.

The embodiments disclosed herein provide a method and system for allocating power in an electrical power system architecture. The technical effect is that the above described embodiments enable the allocation of power output from operational generators, as well as the starting or restarting of a non-operational generator. One advantage that can be realized in the above embodiments is that the above described embodiments have superior weight and size advantages over the conventional type turbine generator systems, since the above described embodiments can be selected, configured, tailored, or operated with known, predetermined, or estimated power generation envelopes or ranges. Power rating of both HP and LP generator system can be significantly reduced. This is because both HP and LP spool on operational engine will share the power extraction needed to start the non-operational engine. Thus, the starting power draw each from side HP generator system and LP generator system of the operational engine is lower compared to if only one generator had to provide the full starting power.

With the proposed allocation between parallel configured generators, a high power output can be achieved without the need for a single larger generator or larger mechanical driving force.

Another advantage that can be realized in the practice of some embodiments of the described systems and methods is that power can be extracted from two or more spools of an engine. The operating efficiency of the engine is also increased by seamlessly controlling the power drawn from HP and LP (and possibly more) spools in various flight phases.

Actual power demand from HP and LP spool can be different than these notional values described above. This disclosure provides ability to optimize the power draw or power generation from HP and LP spools during any phase of the flight for in flight cross-engine starting or restarting of a non-operational engine or engine system. Another benefit of the described aspects is that an aircraft employing such aspects can increase the engine stall margin for corner point conditions on flight envelope (e.g. high altitude, low Mach speed, etc.). For example, LP spool power extraction for an engine would enable power extraction in the range of few hundred kilowatts to megawatts without compromising the stall margin. For instance, in the practice of some embodiments of the described systems and methods is the avoidance of engine stall issues that are typically encountered during a descend mode of the aircraft by sharing the DC load between the HP and LP spools. Being able to draw power from the LP spool as well as the HP spool permits allows the aircraft to run at engine idle speed lower rpms during descent without risk of stall, thereby preserving fuel efficiency of the aircraft.

Yet another benefit of the above described aspects is that the power allocation can be included wherein the essential electrical loads of the non-operation engine can remain powered, energized, or the like, while other non-essential electrical loads associated with the non-operational engine can be shed. Thus, an aircraft employing the aspects of the disclosure can operate with a full flight envelope of essential electrical loads operations regardless of the operational status of the respective or associated engine.

In another aspect of the disclosure, cross-starting of the engine described herein can eliminate the need for electric start air turbine starters.

To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. Combinations or permutations of features described herein are covered by this disclosure.

This written description uses examples to disclose the invention, including the best mode, and also to enable any person skilled in the art to practice the invention, including making and using any devices or systems and performing any incorporated methods. The patentable of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electrical power system architecture, comprising:
    a power distribution bus configured to receive power generated by a first engine having a first generator system and a second generator system;
    a first set of electrical buses connected with the power distribution bus and associated with the first engine;
    a second set of electrical buses configured to selectively connect with the power distribution bus, including at least an essential bus, and associated with a second engine; and
    a share regulator configured to provide a set of share ratios values to the first generator system and the second generator system, and configured to receive an operational status of the second engine;
    wherein, upon receipt of non-operational status of the second engine, the power distribution bus is configured to selectively disconnect the second set of electrical buses except for the essential bus, and the share regulator is configured to provide the set of share ratio values to the first generator system and second generator system selected to enabled the first and second generator systems to share allocation of power generation sufficient to energize the first set of electrical buses and the essential bus.

2. The electrical power system architecture of claim 1 wherein the share regulator is configured to provide a desired power signal to at least one of the first generator system or the second generator system.

3. The electrical power system architecture of claim 2 wherein the at least one of the first or the second generator systems are configured to alter a power output in accordance with the desired power signal.

4. The electrical power system architecture of claim 3 wherein the at least one of the first or the second generator systems are configured to operate in overload mode in response to the desired power signal.

5. The electrical power system architecture of claim 1 wherein the second engine includes a third generator system.

6. The electrical power system architecture of claim 5 wherein the third generator system includes a starter/generator.

7. The electrical power system architecture of claim 6 wherein, upon receipt of non-operational status of the second engine, the share regulator is configured to provide the set of share ratio values to the first generator system and the second generator system, wherein the share ratio values are selected to enabled the first and second generator systems to share allocation of power generation sufficient to energize the starting of the second engine by way of the starter/generator system.

8. The electrical power system architecture according to claim 1 wherein at least one of the first or the second generator systems are mechanically connected to a high pressure spool in the first engine.

9. The electrical power system architecture according to claim 1 wherein at least one of the first or the second generator systems are mechanically connected to a low pressure spool in the first engine.

10. A method for allocating power in an electrical power system architecture, comprising:
    determining an operational status of a first engine system; and
    in response to determining the first engine system is non-operational:
    selectively disconnecting a first set of electrical loads associated with the first engine system from a power distribution bus except for a subset of essential electrical loads associated with the first engine system;
    providing a set of share ratio values to a second operational engine system having at least a first generator and a second generator; and
    operating the first and the second generators in accordance with the set of share ratio values such that the first and the second generators allocate a desired combined power output to the power distribution bus sufficient to energize a second set of electrical loads associated with the second engine system and the subset of essential electrical loads associated with the first engine system.

11. The method of claim 10 wherein the providing includes providing a desired power signal corresponding to the desired combined power output.

12. The method of claim 11 wherein the operating includes altering the power output of at least one of the first or the second generators such that the first and the second generators allocate the desired combined power output based on the desired power signal.

13. The method of claim 10, further including starting the non-operational first engine system having a starter/generator mechanically connected with the first engine system by selectively supplying a starting power from the power distribution bus to the starter/generator, and operating the starter/generator in a starting mode.

14. The method of claim 13 wherein the operating includes operating the first and the second generators such that the first and the second generators allocate a desired combined power output to the power distribution bus sufficient to supply the starting power to the starter/generator and operating the starter/generator in the starting mode.

15. The method of claim 14 wherein the method includes restarting a non-operational gas turbine on an aircraft during flight.

16. The method of claim 10 wherein the providing includes providing a set of share ration values based on a flight phase of an aircraft having the first engine and the second engine.

17. The method of claim 10 wherein operating the first and the second generator include operating at least one of the first or second generators in overload mode.

18. The electrical power system architecture of claim 1 wherein, upon receipt of non-operational status of the second engine, the share regulator is configured to provide the set of share ratio values to the first generator system and the second generator system, wherein the share ratio values are selected to enabled the first and second generator systems to share allocation of power generation sufficient to energize the starting of the second engine by way of a starter/generator system.

19. The electrical power system architecture of claim 1 wherein share ratio representative of the power split ratio among the first generator system and the second generator system.

20. The electrical power system architecture of claim 1 wherein a share regulator configured to provide a set of share ratios values based on a power demand for the electrical power system architecture.

\* \* \* \* \*